(12) United States Patent
Xing et al.

(10) Patent No.: US 9,805,268 B2
(45) Date of Patent: Oct. 31, 2017

(54) SYSTEM AND METHOD FOR PROCESSING A VIDEO STREAM TO EXTRACT HIGHLIGHTS

(71) Applicant: Carnegie Mellon University, Pittsburgh, PA (US)

(72) Inventors: Eric Xing, Pittsburgh, PA (US); Bin Zhao, Pittsburgh, PA (US)

(73) Assignee: Carnegie Mellon University, Pittsburgh, PA (US)

( * ) Notice: Subject to any disclaimer, the term of this patent is extended or adjusted under 35 U.S.C. 154(b) by 0 days.

(21) Appl. No.: 14/798,657

(22) Filed: Jul. 14, 2015

(65) Prior Publication Data

US 2016/0012296 A1    Jan. 14, 2016

Related U.S. Application Data

(60) Provisional application No. 61/999,016, filed on Jul. 14, 2014.

(51) Int. Cl.

| | |
|---|---|
| *H04N 9/80* | (2006.01) |
| *G06K 9/00* | (2006.01) |
| *G11B 27/22* | (2006.01) |
| *G11B 27/30* | (2006.01) |
| *G11B 27/02* | (2006.01) |

(52) U.S. Cl.
CPC ..... *G06K 9/00751* (2013.01); *G06K 9/00718* (2013.01); *G06K 9/00765* (2013.01); *G11B 27/02* (2013.01); *G11B 27/22* (2013.01); *G11B 27/3081* (2013.01)

(58) Field of Classification Search
USPC ............................................... 386/239–248
See application file for complete search history.

(56) References Cited

U.S. PATENT DOCUMENTS

| | | | |
|---|---|---|---|
| 2013/0156321 A1* | 6/2013 | Motoi | G06T 7/0097 382/190 |
| 2014/0176708 A1* | 6/2014 | Ramakrishnan | G06K 9/00771 348/143 |
| 2015/0235379 A1* | 8/2015 | O'Gorman | G06T 7/2033 382/103 |

OTHER PUBLICATIONS

Aner, et al., Video Summaries Through Mosaic-Based Shot and Scene Clustering, Columbia University Press, 2002.
(Continued)

*Primary Examiner* — Hung Dang

(57) ABSTRACT

With the widespread availability of video cameras, we are facing an ever-growing enormous collection of unedited and unstructured video data. Due to lack of an automatic way to generate highlights from this large collection of video streams, these videos can be tedious and time consuming to index or search. The present invention is a novel method of online video highlighting, a principled way of generating a short video highlight summarizing the most important and interesting contents of a potentially very long video, which is costly both time-wise and financially for manual processing. Specifically, the method learns a dictionary from given video using group sparse coding, and updates atoms in the dictionary on-the-fly. A highlight of the given video is then generated by combining segments that cannot be sparsely reconstructed using the learned dictionary. The online fashion of the method enables it to process arbitrarily long videos and starts generating highlights before seeing the end of the video, both attractive characteristics for practical applications.

13 Claims, 10 Drawing Sheets

(56) References Cited

OTHER PUBLICATIONS

Babaguchi, Towards Abstracting Sports Video Highlights, IEEE, 2000.
Defaux, Key Frame Selection to Represent a Video, IEEE, 2000.
Elhamifar, et al., See All Looking at a Few: Sparse Modeling for Finding Representative Objects, IEEE, 2012.
Goldman, et al., Schematic Storyboarding for Video Visualization and Editing, SIGGRAPH, 2006.
Hanjalic, et al., An Integrated Scheme for Automated Video Abstraction Based on Unsupervised Cluster-Validity Analysis, IEEE Trans. Cir and Sys. Video Tech., vol. 9, No. 8, Dec. 1999.
Lee, et al., Discovering Important People and Objects for Egocentric Video Summarization, IEEE Conf. Comp. Vision and Pattern Recog., 2012.
Pfeiffer, et al., Abstracting Digital Movies Automatically, Univ. of Mannheim, 1996.
Rav-Acha, et al., Making a Long Video Short: Dynamic Video Synopsis, IEEE Conf. Comp. Vision and Pattern Recog., 2006.
Truong, et al., Video Abstraction: A Systemetic Review and Classification, ACM Trans. Multimedia Comp. Comm. App., 3, 1, Article 3, Feb. 2007.
Cong, et al., Towards Scalable Summarization of Consumer Videos Via Sparse Dictionary Selection, IEEE Trans. Multimedia, vol. 14, No. 1, Feb. 2012.
Rasheed, et al., Detection and Representation of Scenes in Videos, IEEE Trans. Multimedia, vol. 7, No. 6, Dec. 2005.
Luo, et al., Towards Extracting Semantically Meaningful Key Frames From Personal Video Clips: From Humans to Computers, IEEE Trans. Cir. Sys. Video Tech., vol. 19, No. 2, Feb. 2009.

\* cited by examiner

| Algorithm 1 Online Video Highlighting (LiveLight) |
|---|
| input Video X composed of segments $\{X_1,...,X_K\}$ in temporal order |
| ouput Video highlight Z summarizing most important and interesting contents of X |
| 1: Learn initial dictionary D using $X_0 = \{X_1,...,X_m\}$ via group sparse coding and initialize $Z = X_0$ |
| 2: for all Video segments $X_k$, $\varepsilon \in \{X_{m+1},...,XK\}$ do |
| 3:    Reconstruct video segment $X_k$ using current dictionary D and compute reconstruction error $\varepsilon_k$ |
| 4:    if $\varepsilon_k$ is larger than pre-set threshold $\varepsilon_0$ then |
| 5:       Update dictionary D using $X_k$ and incorporate $X_k$ into video highlight $Z = Z \cup X_k$ |
| 6:    end if |
| 7: end for |

FIG. 6

| Video | Time | Frames | CamMo | Zoom |
|---|---|---|---|---|
| CarRace | 34.00 | 61133 | Yes | No |
| FirefighterSave | 21.53 | 38714 | Yes | Yes |
| MonsterTruck | 50.85 | 91430 | Yes | No |
| StockCar | 38.91 | 69963 | Yes | No |
| SpeedBoat | 64.03 | 115249 | Yes | No |
| DogSwimming | 20.08 | 36106 | No | No |
| PetEvent | 33.63 | 60472 | Yes | Yes |
| HorseTraining | 20.67 | 37171 | Yes | No |
| ShowJumping | 20.73 | 31087 | Yes | Yes |
| Snorkeling | 21.92 | 39463 | Yes | No |
| DisneyParade | 29.10 | 50694 | Yes | No |
| ShamusShow | 21.08 | 37845 | Yes | No |
| BoatTour | 28.36 | 51043 | Yes | Yes |
| AirShow | 12.04 | 21626 | Yes | Yes |
| PolicePullOver | 46.58 | 83761 | Yes | No |
| SubwayExit | 43.27 | 64902 | No | No |
| SubwayEntrance | 96.17 | 144249 | No | No |
| Mall-1 | 55.44 | 83156 | No | No |
| Mall-2 | 39.98 | 59969 | No | No |
| Mall-3 | 60.35 | 90525 | No | No |

FIG. 7

| | T | LL(%) | ES(%) | CL(%) | DSVS(%) |
|---|---|---|---|---|---|
| CarRace | 60.7 | 59.80 | 40.53 | 44.98 | 44.98 |
| FirefighterSave | 59.4 | 66.84 | 38.22 | 52.53 | 55.83 |
| MonsterTruck | 61.6 | 54.38 | 42.05 | 49.35 | 46.36 |
| StockCar | 60.2 | 61.30 | 35.55 | 40.03 | 48.36 |
| SpeedBoat | 59.3 | 75.55 | 45.03 | 59.53 | 77.07 |
| DogSwimming | 62.2 | 79.10 | 42.93 | 54.34 | 64.57 |
| PetEvent | 61.9 | 58.32 | 36.51 | 54.12 | 43.93 |
| HorseTraining | 60.3 | 66.17 | 54.06 | 53.90 | 60.63 |
| ShowJumping | 60.6 | 46.86 | 39.93 | 37.13 | 44.22 |
| Snorkeling | 60.4 | 60.10 | 37.58 | 62.09 | 56.83 |
| DisneyParade | 58.5 | 67.69 | 39.49 | 62.56 | 67.17 |
| ShamusShow | 59.0 | 61.36 | 34.75 | 21.02 | 48.75 |
| BoatTour | 59.9 | 59.28 | 33.89 | 40.57 | 50.93 |
| AirShow | 36.8 | 85.33 | 49.46 | 74.46 | 72.29 |
| PolicePullOver | 61.7 | 91.41 | 30.63 | 60.45 | 76.75 |
| SubwayExit | 89.1 | 91.87 | 21.55 | 47.70 | 85.03 |
| SubwayEntrance | 92.1 | 80.56 | 42.56 | 43.65 | 73.85 |
| Mall-1 | 89.7 | 94.98 | 37.46 | 57.08 | 85.40 |
| Mall-2 | 88.4 | 96.83 | 43.67 | 61.99 | 87.72 |
| Mall-3 | 92.0 | 88.26 | 38.70 | 58.59 | 81.99 |
| Average | - | 72.30 | 39.23 | 51.80 | 64.29 |

FIG. 8

|  | Video | LiveLight | | | | EvenlySpaced | | Clustering | | DSVS | |
| --- | --- | --- | --- | --- | --- | --- | --- | --- | --- | --- | --- |
|  | $T_{video}$ | $T_1$ | $T_2$ | $T_{total}$ | Ratio | $T_{total}$ | Ratio | $T_{total}$ | Ratio | $T_{total}$ | Ratio |
| CarRace | 34.00 | 42.73 | 10.18 | 52.91 | 1.56 | 0.52 | 0.02 | 114.03 | 3.35 | 636.7 | 18.73 |
| FirefighterSave | 21.53 | 27.26 | 8.54 | 35.80 | 1.66 | 0.51 | 0.02 | 78.92 | 3.67 | 434.8 | 20.20 |
| MonsterTruck | 50.85 | 60.23 | 11.60 | 71.83 | 1.41 | 0.59 | 0.01 | 162.23 | 3.19 | 783.3 | 15.40 |
| StockCar | 38.91 | 51.95 | 10.08 | 62.03 | 1.59 | 0.50 | 0.01 | 150.59 | 3.87 | 672.2 | 17.27 |
| SpeedBoat | 64.03 | 39.65 | 9.31 | 48.96 | 0.76 | 0.54 | 0.01 | 102.56 | 1.60 | 460.2 | 7.19 |
| DogSwimming | 20.08 | 5.16 | 6.93 | 12.09 | 0.60 | 0.53 | 0.03 | 33.46 | 1.67 | 174.7 | 8.70 |
| PetEvent | 33.63 | 34.27 | 8.24 | 42.15 | 1.26 | 0.60 | 0.02 | 101.77 | 3.03 | 516.2 | 15.35 |
| HorseTraining | 20.67 | 9.82 | 7.64 | 17.46 | 0.84 | 0.56 | 0.03 | 34.84 | 1.69 | 271.8 | 13.15 |
| ShowJumping | 20.73 | 23.33 | 7.57 | 30.90 | 1.49 | 0.55 | 0.03 | 79.72 | 3.85 | 247.2 | 11.93 |
| Snorkeling | 21.92 | 28.30 | 9.13 | 37.43 | 1.71 | 0.54 | 0.03 | 88.19 | 4.02 | 536.6 | 24.48 |
| DisneyParade | 29.10 | 37.53 | 9.48 | 47.01 | 1.62 | 0.49 | 0.02 | 123.96 | 4.26 | 535.9 | 18.42 |
| ShamusShow | 21.08 | 17.91 | 7.83 | 25.74 | 1.22 | 0.55 | 0.03 | 51.46 | 2.44 | 399.0 | 18.93 |
| BoatTour | 28.36 | 25.56 | 9.13 | 34.69 | 1.22 | 0.50 | 0.02 | 80.48 | 2.84 | 379.8 | 13.39 |
| AirShow | 12.04 | 8.37 | 7.24 | 15.61 | 1.30 | 0.31 | 0.03 | 42.34 | 3.52 | 225.0 | 18.68 |
| PolicePullOver | 46.58 | 16.07 | 8.33 | 24.40 | 0.52 | 0.56 | 0.01 | 53.24 | 1.14 | 493.3 | 10.59 |
| SubwayExit | 43.27 | 14.46 | 6.67 | 21.13 | 0.49 | 0.75 | 0.02 | 148.8 | 3.44 | 558.6 | 12.91 |
| SubwayEntrance | 96.17 | 41.30 | 9.55 | 50.85 | 0.53 | 0.84 | 0.01 | 304.15 | 3.16 | 1299.1 | 13.51 |
| Mall-1 | 55.44 | 51.02 | 9.93 | 60.95 | 1.10 | 0.82 | 0.02 | 139.23 | 2.51 | 646.4 | 11.66 |
| Mall-2 | 39.98 | 33.49 | 8.95 | 42.44 | 1.06 | 0.80 | 0.02 | 94.75 | 2.37 | 436.5 | 10.92 |
| Mall-3 | 60.35 | 58.02 | 10.31 | 68.33 | 1.13 | 0.78 | 0.01 | 137.20 | 2.27 | 698.4 | 11.57 |

FIG. 9

SYSTEM AND METHOD FOR PROCESSING A VIDEO STREAM TO EXTRACT HIGHLIGHTS

RELATED APPLICATIONS

This application claims the benefit of U.S. Provisional Patent Application Ser. No. 61/999,016, filed Jul. 14, 2014.

GOVERNMENT INTEREST

This invention was made with government support under the NSF Number IIS-1115313. The government has certain rights in this invention.

BACKGROUND OF THE INVENTION

Consumers and organizations are inundated with billions of hours of video footage every day, potentially containing events, people, and objects of context-dependent and time-space-sensitive interests. However, even to the creators and owners of the video data, and to the people who are granted access for various purposes, the content in these videos remains unindexed, unstructured, unsearchable and unusable. Watching the recorded footage in real-time, or even playing it at 2× or 4× speed is tedious. It is no surprise that, with this increasing body of unstructured video data, information contained therein is nearly impossible to efficiently access unless it has already been seen and indexed, an undertaking which would be tedious and time consuming for a human, but an ideal challenge for machine intelligence.

Previous research on video summarization and abstraction has mainly focused on edited videos, e.g., movies, news, and sports, which are highly structured. For example, a movie could be naturally divided into scenes, each formed by one or more shots taking place at the same site, where each shot is further composed of frames with smooth and continuous motions. However, consumer generated videos and surveillance videos lack such structure, often rendering previous research not directly applicable.

Key frame based methods compose a video summary as a collection of salient images (key frames) picked from the original video. Various strategies have been studied, including shot boundary detection, color histogram analysis, motion stability, clustering, curve splitting and frame self-expressiveness. However, isolated and uncorrelated still images, without smooth temporal continuation, are not best suited to help the viewer understand the original video. Moreover, one prior art method proposes a saliency based method, which trains a linear regression model to predict importance score for each frame in egocentric videos. However, special features designed in that method limit its applicability only to videos generated by wearable cameras.

Besides picking frames from the original video, methods creating new images not present in the original video have also been studied, where a panoramic image is generated from a few consecutive frames determined to have important content. However, the number of consecutive frames from the original video used to construct such a panoramic image is limited by occlusion between objects from different frames. Consequently, these approaches generally produce short clips with few objects.

Finally, summaries composed by a collection of video segments, have been studied for edited videos. Specifically, one prior art method uses scene boundary detection, dialogue analysis, and color histogram analysis to produce a trailer for a feature film. Other prior art methods extract important segments from sports and news programs utilizing special characteristics of these videos, including fixed scene structures, dominant locations, and backgrounds. Still other methods utilize closed caption and speech recognition to transform video summarization into a text summarization problem and generate summaries using natural language processing techniques. However, the large body of consumer generated videos and surveillance videos typically have no such special structure, and often, especially with surveillance video, audio information is absent.

SUMMARY OF THE INVENTION

In one aspect of the present invention, a method is performed by one or more processing devices. The method automatically compiling the most salient and informative portion of the video data for users by automatically scanning through a video stream to remove repetitive and uninteresting content.

The method, referred to as online video highlighting, is a principled way of generating a short video highlight summarizing the most important and interesting contents of a much longer video. Specifically, the method scans through the video stream which is divided into a collection of video segments temporally. After processing the first few segments, a dictionary is constructed, which is updated and refined as more video is processed. Given a new video segment, in one example, the present invention employs the current version of the dictionary to sparsely reconstruct this previously unseen video data, using group sparse coding.

A small reconstruction error of the new video segment reflects that its content is already well represented in the current dictionary, suggesting video segments containing similar contents have been observed before and are already part of the highlights. Therefore, this video segment is excluded from the video highlight, and the algorithm moves on to the next segment. On the other hand, if the new video segment cannot be sparsely reconstructed, i.e., a high reconstruction error is obtained, this indicated that the segment contains unseen content from previous video data, and the video segment is incorporated into the highlights. At the same time, the dictionary is updated to reflect the newly included video data. This process continues until the end of the video is reached.

BRIEF DESCRIPTION OF THE DRAWINGS

Note that in all figures, still images are shown, however, it should be realized that each still image shown is actually a single frame representing a short video segment for purposes of explanation herein.

FIG. 2b shows the reconstruction error for each video segment in FIG. 2a.

FIG. 6 shows the algorithm used in the preferred embodiment of the invention.

FIG. 7 is a table providing details of a data set of 20 videos used in performance testing of the preferred embodiment of the invention.

FIG. 8 is a table providing summary data of the results of processing the 20 video data set of FIG. 7.

FIG. 9 is a table showing a comparison of the processing time of the invention versus other methods.

DETAILED DESCRIPTION

Figure 1:
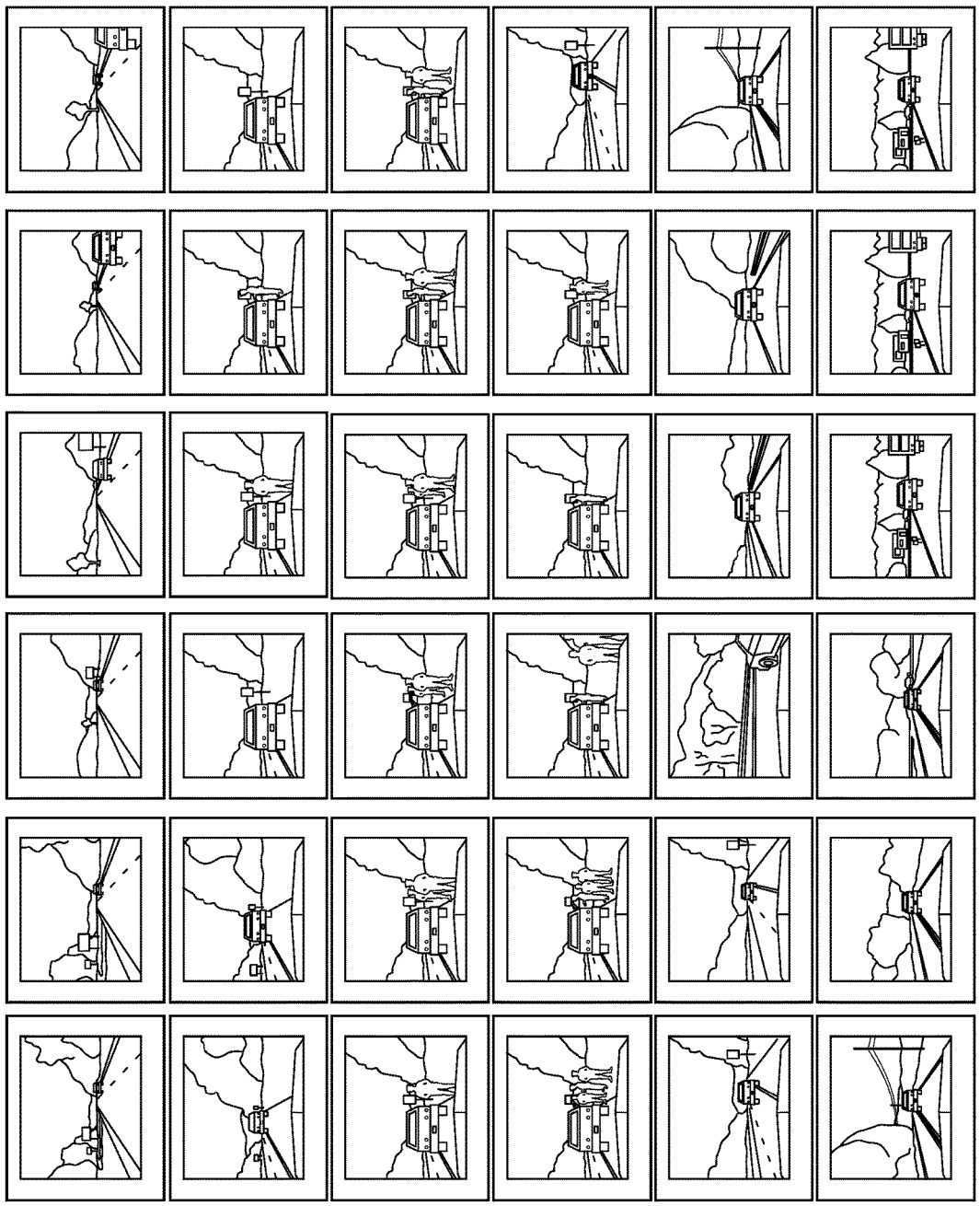
FIG. 1 shows some frames of the highlight generated by the present invention for a YouTube video showing police pulling over a black SUV and making an arrest.

In one embodiment, the present invention sequentially scans the video stream once, learns a dictionary to summarize content seen in the video and updates the dictionary after encountering video data that could not be sparsely reconstructed explained using the current dictionary. Implementations of the disclosure can include one or more of the following features. In some implementations, a highlight video is constructed as a combination of two groups of video segments: (1) the first few segments used to initialize the dictionary, capturing background and early contents of the video; and (2) video segments causing dictionary update, suggesting unseen and interesting content. Moreover, as the entire process is carried out, the present invention could handle hours of video data, which are ubiquitous in consumer generated videos and surveillance videos. A system for implementing the method of the present invention can be run on a single machine, a cluster, or cloud.

In one embodiment of the invention, given an unedited and unstructured video sequence, online video highlighting starts with dividing the original video data into a collection of video segments, each composed of fixed number of frames. These video segments are the base units in the method, in the sense that a few selected ones will compose the final video highlight. A key component in the method is the dictionary, which summarizes the contents of observed video data. Specifically, a dictionary is initially learned using a fixed number of video segments at the beginning of the input video, with sparse group coding. After dictionary initialization, the method scans through the remaining video segments following in temporal order, and attempts to reconstruct each video segment using the learned dictionary. Those video segments with reconstruction error higher than certain, predetermined threshold are considered to contain unseen and interesting content unrepresented in previous video segments, and are included into the video highlight.

When new video segments are added to the highlight, the dictionary is updated accordingly to incorporate the newly observed video content, such that similar video segments seen later will result in a much smaller reconstruction error, indicating that they are similar to previously-seen segments and should not be included in the highlight. Those video segments that could be well reconstructed using the current dictionary are excluded from the highlight, as a small reconstruction error suggests that the content of the video segment is already well represented in the current dictionary, and, as such, in the highlight, and further indicating video segments containing similar contents have been observed before. Therefore, the dictionary represents the knowledge about previously seen video content, and is updated, in one example, to incorporate newly observed contents. Algorithm 1, shown in FIG. 6, provides the work flow of the method of the present invention, where $X_0 = \{X_1, \ldots, X_m\}$ is used to learn initial dictionary with $m \ll K$, and $\epsilon_0$ is a pre-set threshold parameter controlling the length of the video highlight.

In one embodiment, the method includes representing the knowledge of previously observed video segments using the learned dictionary D, whose columns (also referred to as "atoms") are the basis for reconstructing future video segments. Given learned dictionary D, the method sparsely reconstructs a query video segment using its atoms. Specifically, sparse reconstruction indicates both small reconstruction error and a small footprint on the dictionary (i.e., using as few atoms from the dictionary as possible). Consequently, generating the short video highlight is formulated as a sparse coding problem, which seeks linear decomposition of data using a few elements from a learned dictionary, instead of a predefined one, such as wavelets.

In one example, the video data has feature representation based on spatio-temporal cuboids, to detect salient points within the video and describe the local spatio-temporal patch around the detected interest points. Different from optical flow, this feature representation only describes spatio-temporal salient regions, instead of the entire frame. On the other hand, spatio-temporal cuboids are less affected by occlusion, a key difficulty in tracking trajectory based representations. In one example, the spatio-temporal interest points are detected and describe each detected interest point with a histogram of gradient (HoG) and histogram of optical flow (HoF). The feature representation for each detected interest point is then obtained by concatenating the HoG feature vector and HoF feature vector. Finally, in one embodiment, each video segment is represented as a collection of feature vectors, corresponding to detected interest points, i.e., $X_k = \{x_1, \ldots, x_{n_k}\}$, where $n_k$ is the number of interest points detected in video segment $X_k$.

Different from conventional settings of sparse coding, where the input signal is a vector, the input signal in the present method is a video segment, represented as a group of vectors $X_k = \{x_1, \ldots, x_{n_k}\}$. Therefore, in one example, the method effectively encodes groups of instances in terms of a set of dictionary atoms $D = \{d_j\}_{j=1}^{|D|}$, where $|D|$ is the size of the dictionary, i.e., the number of atoms in D. Specifically, given learned dictionary D, the present invention seeks sparse reconstruction of the query segment X, as follows $$\min_A \frac{1}{2} \frac{1}{|X|} \sum_{x_i \in X} \left\| x_i - \sum_{j=1}^{|D|} \alpha^j_i d_j \right\|_2^2 + \lambda \sum_{j=1}^{|D|} \|\alpha\|_2 \quad (1)$$

where $A = \{\alpha^1, \ldots, \alpha^{|X|}\}$, $\alpha^i \in \mathbb{R}^{|D|}$ is the reconstruction vector for interest point $x_i \in X$, and $|X|$ is the number of interest points detected within video segment X. The first term in equation (1) is reconstruction cost. If video segments similar to X have been observed before, this reconstruction cost should be small, due to the assumption that the learned dictionary represents knowledge in the previously seen video segments. The second term is the group sparsity regularization. Because dictionary D is learned to sparsely reconstruct previously seen video segments, if X contains no interesting or unseen contents, it should also be sparsely reconstructible using few atoms in D. On the other hand, if the content in X have never been observed in previous video segments, although it is possible that a fairly small reconstruction cost could be achieved, using a large amount of video fragments for this reconstruction, resulting in dense reconstruction weight vectors. Moreover, the special mixed $\ell_1/\ell_2$ norm of A used in the second term regularizes the number of dictionary atoms used to reconstruct the entire video segment X. This is more preferable over conventional $\ell_1$ regularization, as a simple $\ell_1$ regularizer only ensures sparse weight vector for each interest point $x_i \in X$, but it is highly possible that different interest points will have very different footprints on the dictionary, i.e., using very different atoms for sparse reconstruction. Consequently, reconstruction for the video segment X could still involve a large number of atoms in D. On the other hand, the $\ell_1/\ell_2$ regularizer ensures a small footprint of the entire video segment X, as all interest points within segment X are regularized to use the same group of atoms for reconstruction. Moreover, the tradeoff between accurate reconstruction and compact encoding is controlled by regularization parameter $\lambda$. Finally, the value of equation (1) is denoted with optimal reconstruction matrix A as $\epsilon$, which is used in Algorithm 1 to decide if segment X should be incorporated into the video highlight.

In one embodiment, given a dictionary optimized to sparsely reconstruct previously seen video contents, a new segment exhibiting similar contents seen in previous video data should be re-constructible from a small number of such atoms. On the other hand, a video segment unveiling contents never seen before is either not re-constructible from the dictionary of previous video segments with small error, or, even if it is re-constructible, it would necessarily build on a combination of a large number of atoms in the dictionary. Crucial to this technique is the ability to learn a good dictionary of atoms representing content seen in previous video segments, and being able to update the dictionary to adapt to changing content of the video.

To find the optimal reconstruction vector $\alpha^i$ for each interest point $x_i \in X$, we need to solve equation (1). In one example, the alternating direction method of multipliers (ADMM) is used to carry out the optimization, due to its simplicity and efficiency. Specifically, ADMM is a simple yet powerful algorithm, which takes the form of a decomposition-coordination procedure, where the solutions to small local sub-problems are coordinated to find a solution to a large global problem.

Implementations of the present invention can include one or more of the following features. The construction of the initial dictionary is a prerequisite to launching the video highlighting procedure. Specifically, a crucial parameter of the method is size of the dictionary, and a method of constructing and maintaining the dictionary is needed that facilitates (1) the induction of new dictionary atoms; and (2) the removal of dictionary atoms with low predictive power. To achieve this, the $\ell_1/\ell_2$ regularization is applied again, this time to dictionary atoms. The idea for this regularization is that uninformative dictionary atoms will be regularized towards 0, effectively removing them from the dictionary. Given first few video segments $X_0 = \{X_1, \ldots, X_m\}$, the learning optimal initial dictionary is formulated as follows $$\min_{D, \{A_1, \ldots, A_m\}} \frac{1}{m} \sum_{X_k \subset X_0} J(X_k, A_k, D) + \gamma \sum_{j=1}^{|D|} \|d_j\|_2 \quad (2)$$

where $J(X_k, A_k, D)$ is the reconstruction error for $X_k$ using dictionary D, with reconstruction coefficients $A_k$, i.e., the objective function in (1), and $\gamma$ balances reconstruction quality and dictionary size. Though non-convex to D and $\{A_1, \ldots, A_m\}$ jointly, equation (2) is convex with respect to $\{A_1, \ldots, A_m\}$ when D is fixed, and also convex with respect to D with fixed $\{A_1, \ldots, A_m\}$. A natural solution is to alternate between these two variables, optimizing one while clamping the other. Specifically, with fixed dictionary D, each $A_k \in \{A_1, \ldots, A_m\}$ can be optimized individually, using optimization method described in the previous section. On the other hand, with fixed $\{A_1, \ldots, A_m\}$, optimizing dictionary D can be similarly solved via ADMM.

As the method scans through the video, segments that cannot be sparsely reconstructed using the current dictionary, indicating unseen and interesting contents, are incorporated into the video highlight. However, all following occurrences of similar content appearing in later video segments should ideally be excluded. Consequently, it is crucial to update the dictionary such that those video segments already included in the video highlight should no longer result in large reconstruction error. Therefore, in one embodiment, the method updates the dictionary after each inclusion of video segment into the highlight $\mathcal{Z}_\cdot$.

In one example, assume that the current version of the highlight is $\mathcal{Z}_t$, composed of t video segments $\{X_k\}_{k=1}^{t}$, then the optimal dictionary is the solution of the following problem $$\min_D f(D) = \min_{A_1, \ldots, A_t} \frac{1}{t} \sum_{X_k \subset \mathcal{Z}_t} J(X_k, A_k, D) + \gamma \sum_{j=1}^{|D|} \|d_j\|_2 \quad (3)$$

In one example, the method employs online learning for efficient dictionary update. Specifically, instead of optimizing dictionary D and reconstruction coefficients $A_1, \ldots, A_t$ simultaneously, the method aggregates the past information computed during the previous steps of the algorithm, namely the reconstruction coefficients $\{\hat{A}_1, \ldots, \hat{A}_t\}$ computed using previous versions of dictionary, and only optimizes D in equation (3). Therefore, the online dictionary update seeks to solve the following approximate optimization problem $$\min_D \hat{f}(D) = \frac{1}{t} \sum_{X_k \subset \mathcal{Z}_t} J(X_k, \hat{A}_k, D) + \gamma \sum_{j=1}^{|D|} \|d_j\|_2 \quad (4)$$

In this example, $\hat{f}(D)$ upper bounds $f(D)$ in equation (3). Moreover, $\hat{f}(D)$ and $f(D)$ converges to the same limit and consequently $\hat{f}(D)$ acts as a surrogate for $f(D)$. Moreover, it is easy to show that equation (4) could be equivalently reformulated as follows $$\min_D \frac{1}{2t} Tr(D^T D P_t) - \frac{1}{t} Tr(D^T Q_t) + \gamma \sum_{j=1}^{|D|} \|d_j\|_2 \quad (5)$$

where $Tr(\bullet)$ is matrix trace, $P_t$ and $Q_t$ are defined as $$P_t = \sum_{k=1}^{t} \sum_{\alpha^i \in A_k} \alpha^i \alpha^{iT}, \quad Q_t = \sum_{k=1}^{t} \sum_{\alpha^i \in A_k} x_i \alpha^{iT} \quad (6)$$

Therefore, there is no need to store $\{\hat{A}_k\}_{k=1}^{t}$ or $\{X_k\}_{k=1}^{t}$, as all necessary information is stored in $P_t$ and $Q_t$. Finally, equation (5) could be efficiently solved using ADMM.

In one example, the convergence property of the dictionary update is examined. Specifically, Theorem 1—Denote the sequence of dictionaries learned as $\{D_t\}$, where $D_1$ is the initial dictionary. Then $\hat{f}(D)$, defined in equation (4), is the surrogate function of $f(D)$, defined in equation (3), satisfying (1) $f(D)-\hat{f}(D)$ converges to 0 almost surely;
(2) $D_t$ obtained by optimizing $\hat{f}$ is asymptotically close to the set of stationary points of (3) with probability 1

Theorem 1 guarantees that $\hat{f}(D)$ could be used as a proper surrogate for $f(D)$, such that equation (4) can be optimized to obtain the optimal dictionary efficiently.

Next, in one embodiment, the generalization ability of the method on unseen video segments is examined. Specifically, as the method scans through the video sequence, the dictionary is learned and updated only using video segments seen so far. Consequently, the dictionary is optimized to sparsely reconstruct contents in seen video segments. It is crucial for the method to also be able to sparsely reconstruct unseen video segments, composed of contents similar to video segments seen before. Specifically, Theorem 2. Assume data points X (i.e., video segments) are generated from unknown probability distribution $\mathcal{P}$.. Given t observations $\{X_1, \ldots, X_t\}$, for any dictionary D, and any fixed $\delta>0$, with probability at least $1-\delta$ $$\mathbb{E}_{X \sim \mathcal{P}} J^*(X, D) - \frac{1}{t}\sum_{k=1}^{t} J^*(X_k, D) \le \epsilon(t, \delta) \quad (7)$$

where $J^*(X, D)=\min_A J(X, A, D)$ is the minimal reconstruction error for X using dictionary D, as defined in equation (1), and $\epsilon(t, \delta)=o(\ln t/\sqrt{t})$ is a small constant that decreases as t increases.

The above theorem is true for any dictionary D, and obviously also true for the dictionary learned in the method. Therefore, Theorem 2 guarantees that if dictionary D has small reconstruction error on previously seen video segments, it will also result in small reconstruction error for unseen video segments with similar contents.

In one example, performance is tested on more than 12 hours of consumer videos, including both YouTube videos and surveillance videos. The 20 videos in the data set span a wide variety of scenarios: indoor and outdoor, moving camera and still camera, with and without camera zoom in/out, with different categories of targets (human, vehicles, planes, animals etc.) and covers a wide variety of activities and environmental conditions. Details about the data set are provided in the table shown in FIG. 7. In the data set, the first 15 videos were downloaded from YouTube, and the last 5 videos are captured from surveillance cameras. Video length (Time) is measured in minutes. "CamMo" stands for camera motion, and Zoom means camera zoom in/out.

Figure 2A:
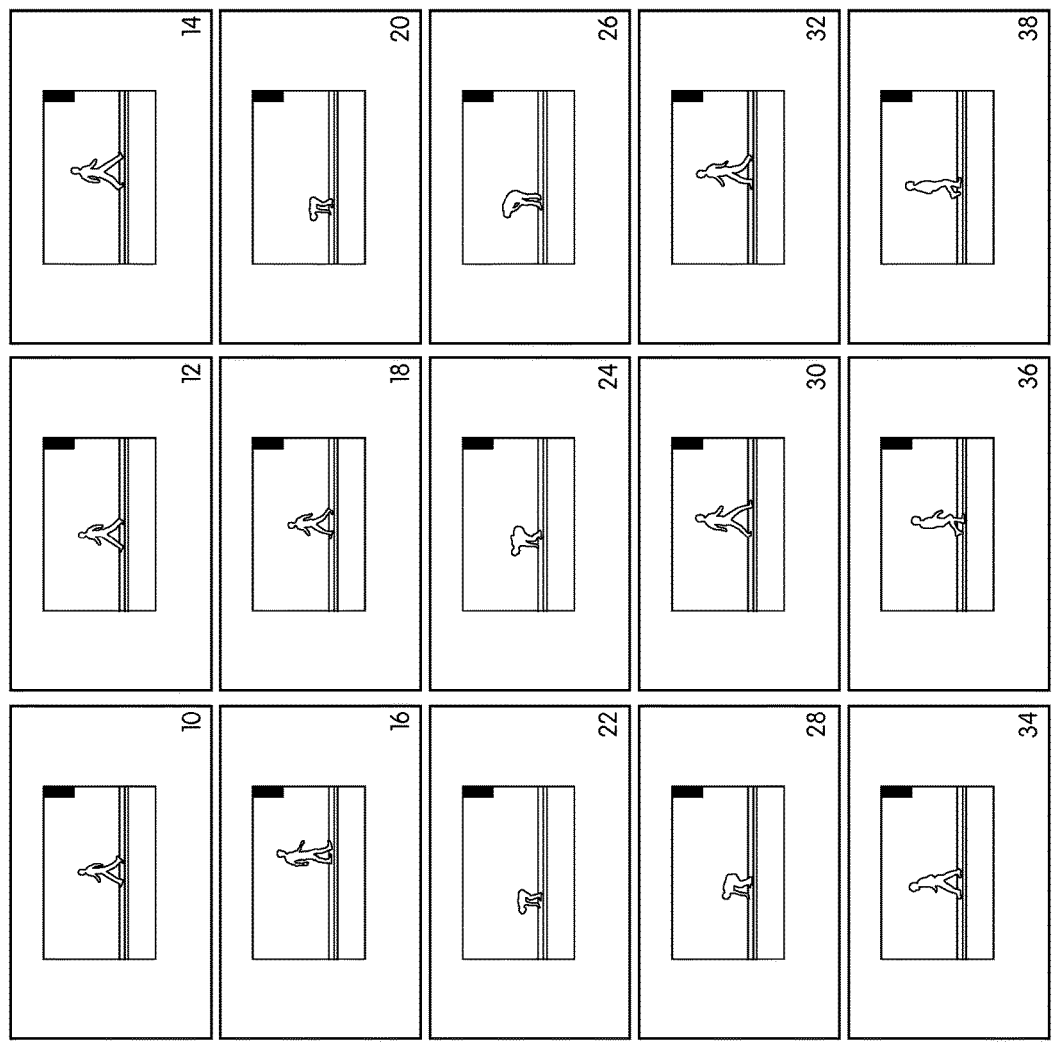
FIG. 2a shows 15 video segments.
Figure 2B:
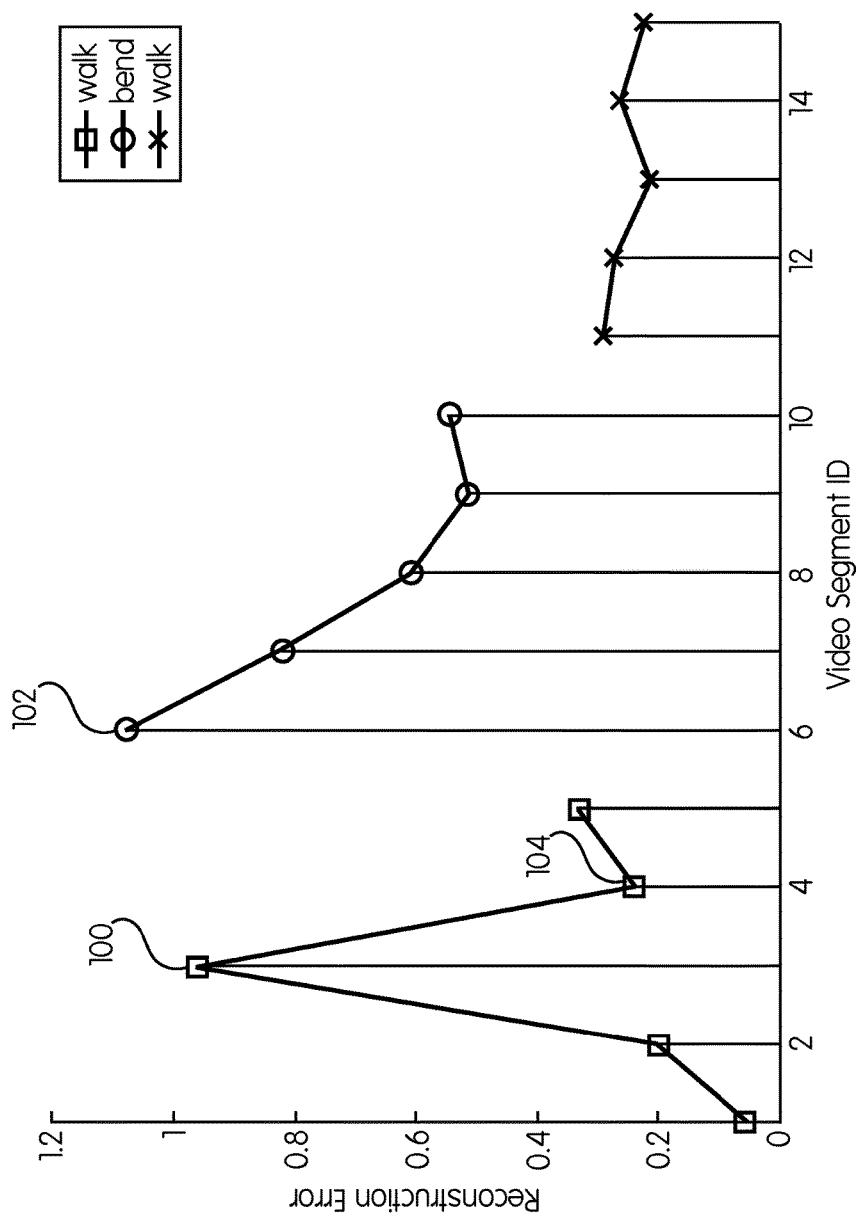

Implementations of the disclosure can include one or more of the following features. In some implementations, start with synthetic video data to test performance of the method in a controlled environment. In one example, two types of video sequences from Weizmann human action recognition data collection, i.e., walk and bend are used. The synthetic video is shown in FIG. 2a and was constructed by combining 5 walk sequences 10-18, followed by 5 bend sequences 20-28, and 5 more walk sequences 30-28. The method learns the initial dictionary using the first walk sequence, and carries out reconstruction and online dictionary update on the remaining 14 video sequences. Reconstruction errors for all video sequences are shown in FIG. 2b. There are 2 clear peaks in FIG. 2b, corresponding to the third walk sequence 100, which is the first occurrence of walking from left to right (the first and second sequences are both walking from right to left), and the first bend sequence 102. Moreover, the reconstruction error for the fourth walk sequence 104, which also shows walking from left to right, is significantly smaller then the third walk sequence 100, indicating the dictionary has learned the contents of walking to the right, through online dictionary update. Finally, the last 5 walk sequences all result in small reconstruction errors, even after 5 bend sequences 20-28 have been observed, showing that the dictionary retains its knowledge about walk.

Figure 3:
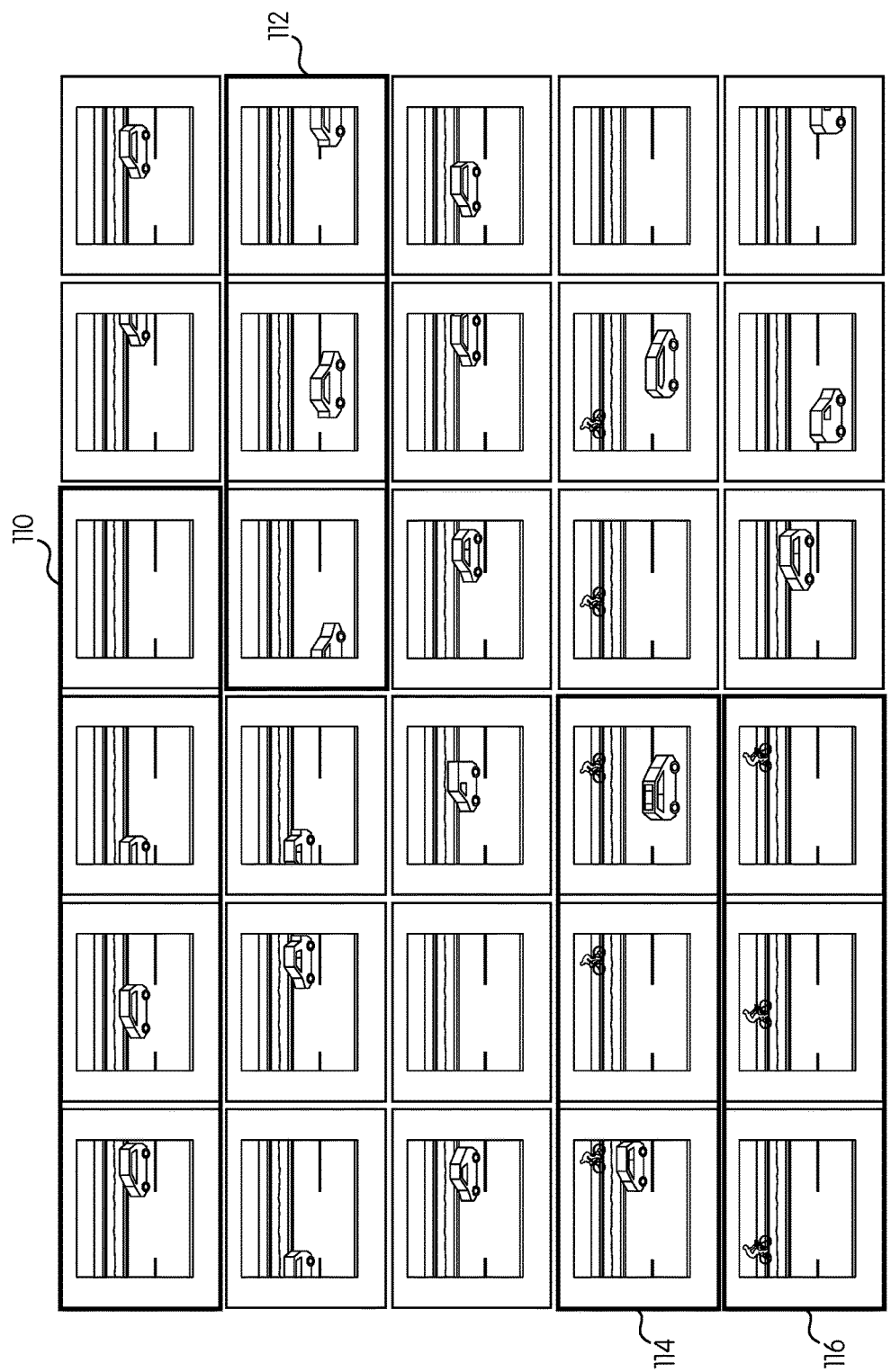
FIG. 3 shows some frames of the traffic surveillance video and the generated video highlight.

A traffic surveillance video was obtained using a surveillance camera looking over a two-lane road. In one example, the video is 60 seconds long, with 1495 frames. The first 50 frames are used to learn the initial dictionary. The video is divided into segments each consisting 10 frames, and an 8-second highlight is generated. Sample frames from this video together with the video highlight are shown in FIG. 3. Interestingly, though there are multiple occurrences of cars traveling from left to right, and from right to left, only the first appearance of these two events is included, and all succeeding similar segments are excluded.

In FIG. 3, the video segments incorporated in the video highlight are shown in the red bounding boxes: (1) A car travels from right to left 110; (2) A car travels from left to right 112; (3) Two people push a bike from right to left 114; and (4) A person walks by 116.

Figure 4:
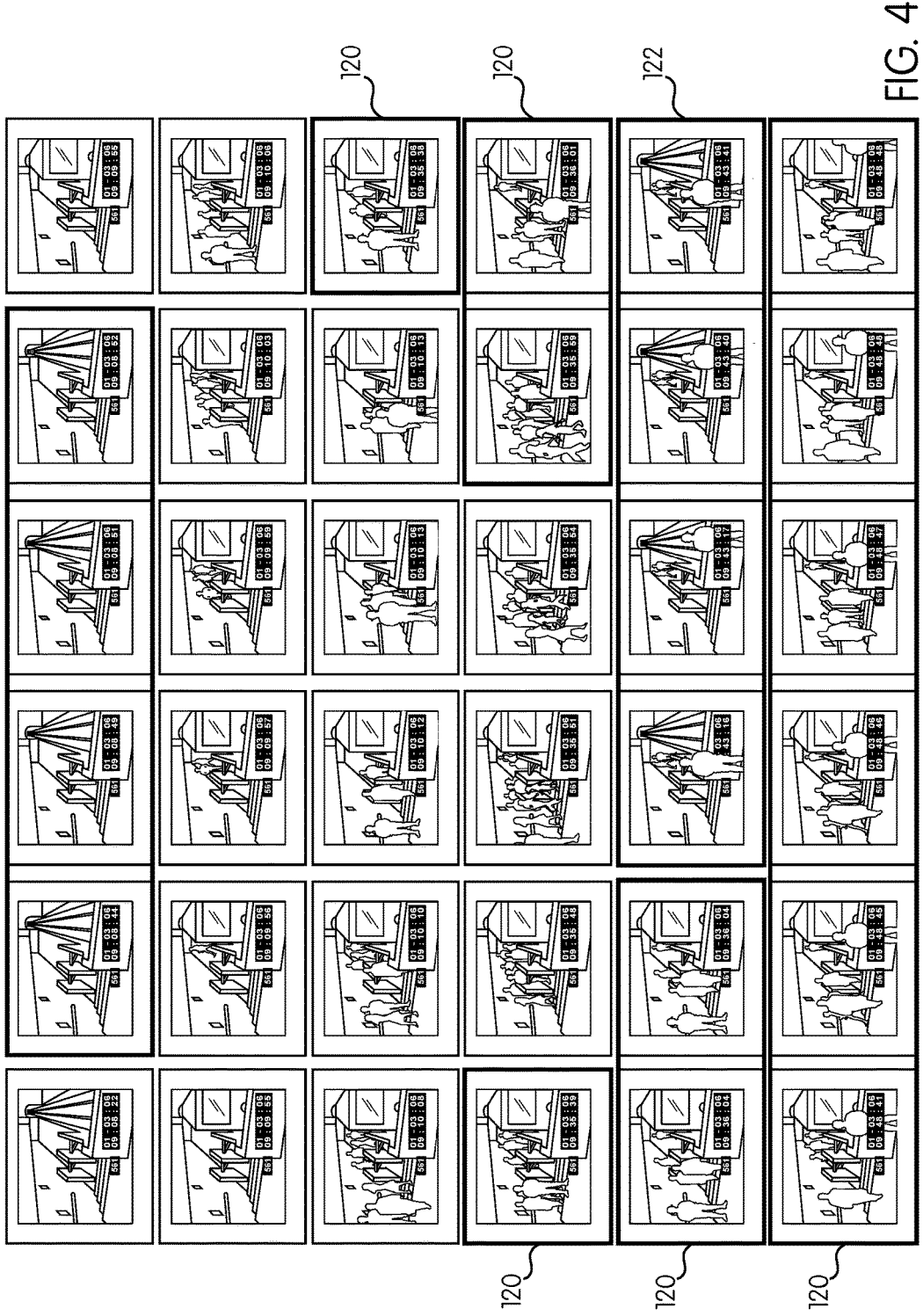
FIG. 4 illustrates some frames of the video highlight for subway surveillance video.

In another example, a subway exit surveillance video is taken by, in one example, a surveillance camera at a subway station, monitoring the exit. The video is 43 minutes long with 64901 frames in total. The first 200 frames are used to learn the initial dictionary, with each video segment composed of 20 frames, and generates a 40-second highlight. Results are shown in FIG. 4, where it can be seen that, besides conventional contents, such as train stopping, passengers getting off the train and exiting the station, the video highlight also captures interesting or even suspicious behaviors requiring further human attention, such as (1) walking into the station through exit, i.e., trying to take the train without paying; or (2) loitering near the exit. Therefore, the amount of video sequences is effectively reduced, requiring less human attention, while retaining suspicious behaviors. Specifically, in FIG. 4, frames in purple bounding boxes 120 show people walking in the wrong direction, i.e., getting into the station through exit, and frames in green bounding boxes 122 show loitering near the exit.

The above example demonstrates the effectiveness of the method of the present invention on surveillance videos, with fixed camera and relatively controlled environment. However, this is a general approach that makes no assumptions about the cameras, the types of environment, or the contents of the video. In one example, the method is applied to a number of videos "in the wild", highlighting its application to a wide range of data. Specifically, in one example, 2 videos are downloaded from YouTube. These videos exhibit various camera motions (for example, rotation, zoom in/out, etc.), contain different categories of targets (human, vehicles, planes, etc.) and cover a wide variety of activities and environmental conditions.

The highlights from a police pull-over and arrest video is shown in FIG. 1 (for all figures in this paper, frames are organized from left to right, then top to bottom in temporal order). From the video highlight, we could see the following storyline of the video: (1) Police car travels on the highway; (2) Police car pulls over black SUV; (3) Police officer talks to passenger in the SUV; (4) Two police officers walk up to the SUV, and open the passenger side door of the SUV; (5) Police officer makes arrest of a man in white shirt; (6) Police officer talks to passenger in the SUV again; (7) Both police car and black SUV pull into highway traffic; (8) Police car follows black SUV off the highway; (9) Both vehicles travel in local traffic; (10) Black SUV pulls into local community. The police pull-over video is 46.6 minutes long, taken by a camera mounted on the police car. In this example, the first 500 frames are used to learn the initial dictionary, and the video is divided into segments each composed of 50 frames. The final highlight is 68 seconds long. As shown in FIG. 1, the highlight captures the entire story line of this near hour long video, achieving more than 40 times compression of the original data without losing semantic understandability of the video highlight. Moreover, the background in this video involves various cars passing in both directions, and it is interesting that the method is not affected by this background motion.

Figure 5:
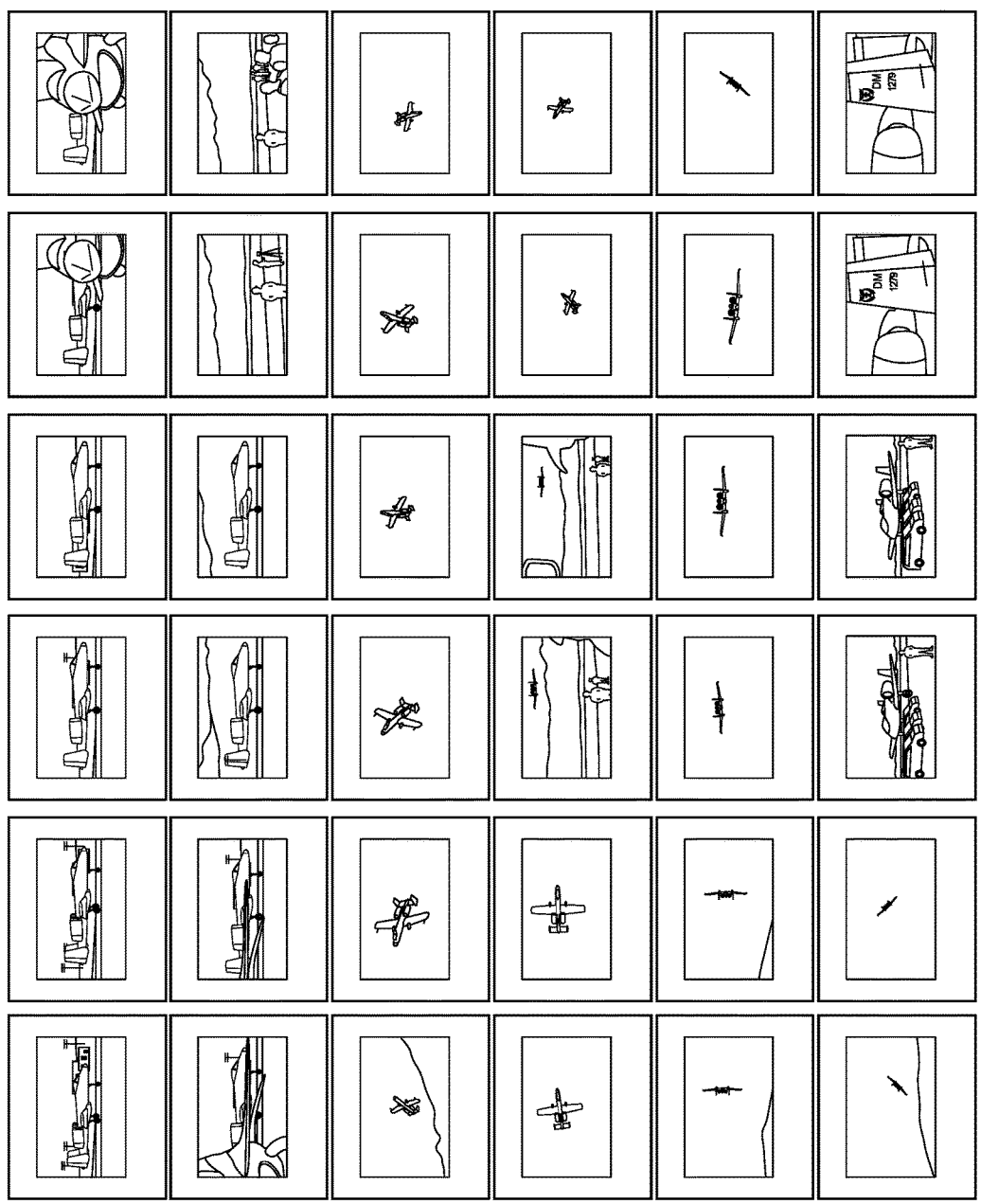
FIG. 5 shows some frames of the video highlight for an air show video.

The air show video is 12 minutes long, taken by a hand-held camera, with severe camera motion, zoom in/out, and motion blur. In one example, a 37 second video highlight is generated, with the initial dictionary learned using first 200 frames, and each segment composed of 20 frames. According to FIG. 5, the entire process of taking off, together with various stunts performed by the plane are captured, (i.e., the "highlights" of this video), and the highlights end with landing frames. Consequently, instead of watching this 12-minute long low-quality video, a viewer could spend nearly 20 times less time to see the generated video highlight, without missing the portions of the original video which are most interesting. Referring to FIG. 5, from the video highlight, we could see the following storyline of the video: (1) The plane starts taking off; (2) The plane passes another plane during taking off; (3) The plane takes off; (4) Other people watching the air show caught on camera; (5) The plane performs various stunts, including flying side-way, flying upside down, diving close to the ground, etc.; (6) The plane lands. It should be noted that at the end of the video highlight, it seems that the method did not capture the process of landing. However, the reason for lacking such process is because the original video does not have this part at all.

The method of the present invention was compared with several other methods, including evenly spaced segments, K-means clustering using the same features as the present invention, and a DSVS algorithm which is a state-of-the-art method for video summarization. It is known that the DSVS algorithm already beats color histogram-based methods and motion-based methods. Parameters for various algorithms are set such that the length of generated summary videos is the same as ground truth video. Preferably, number of atoms in dictionary is fixed at 200, though better performance is possible with fine tuning of parameters. As one of skill in the art would realize, this parameter may be adjusted up or down to obtain similar results, although performance (speed and accuracy) of the method may vary.

For each video in the data set, three judges selected segments from an original video to compose their preferred version of a summary video. The judges' final highlight video is then constructed by pooling together those segments selected by at least two judges. To quantitatively determine the overlap between algorithm generated summary and the judges' selections, both video segment content and time differences are considered. Specifically, two video segments must occur within a short period of time (two seconds in our experiments), and must be similar in scene content and motion pattern to be considered equivalent. Final accuracy is computed as the ratio of segments in algorithm generated summary video that overlaps with the judges' selections.

The table shown in FIG. 8, in which T is the length (seconds) of summary video; LL is the time for the present invention; ES is evenly spaced segments; CL denotes K-Means Clustering and DSVS is sparse reconstruction using original video as basis, shows a quantitative comparison. The following observations were noted: (1) the present invention achieves highest accuracy on 18 out of 20 videos, and in most cases beats competing algorithms with a significant margin; (2) On the 5 surveillance videos, both the present invention and DSVS outperform the other two algorithms, showing the advantage of sparse reconstruction based methods on summarizing surveillance videos; and (3) Averaged across 20 videos, the present invention outperformed the state-of-the-art summarization method DSVS by 8%.

In some of the implementations, the present invention is implemented using MATLAB 7.12 running on a 3.40 GHZ Intel Core i7 PC with 16:0 GB main memory. The table shown in FIG. 9 shows the processing time of the present invention ("LiveLight") versus competing algorithms (all time shown is in minutes), in which $T_{video}$ is the length of original video. $T_1$ is the time spent on generating feature representations and $T_2$ is the combined time spent on learning initial dictionary, video segment reconstruction and online dictionary update. $T_{total}=T_1+T_2$ is the total processing time of LiveLight, and Ratio=$T_{total}/T_{video}$ for all algorithms.

The table in FIG. 9 compares the processing time of various algorithms, with the following observations: (1) The last column under the heading "LiveLight" shows the ratio between the computational time and video length of the method of the present invention. For all videos, this ratio is less than 2, and for 6 videos even less than 1. Thus, with MATLAB implementation on a conventional PC, the present invention already achieves near real-time speed, further revealing its promise in real world video analysis applications; and (2) the present invention is nearly 10 times faster than DSVS, revealing the advantage of learning and updating dictionary during processing, as opposed to using the original video as the basis for sparse reconstruction.

While this invention has been described primarily in terms of embodiments using video, those skilled in the art will recognize that the methods of the present invention could also be used for other types of visual images, such as the most salient part of an image.

We claim:

1. A system for extracting video highlights from a video stream comprising:
    storage, containing said video stream in digital form; and
    a processor, in communication with said storage, said processor executing software for performing the following functions:
    i. reading an initial plurality of frames from said video stream and constructing a new dictionary based on said initial plurality of frames, said dictionary containing data summarizing the content of said initial plurality of frames;
    ii. breaking the remainder of said video stream into a plurality of segments of approximately equal length;
    iii. reading the next segment from said video stream;
    iv. detecting interest points in said segment and defining a local spatio-temporal cuboid for each of said detected interest points;
    v. calculating, for each of said spatio-temporal cuboids, a plurality of feature vectors and concatenating said plurality of feature vectors into a feature representation for each of said spatio-temporal cuboids;
    vi. determining if a group of feature representations representing all of said spatio-temporal cuboids in said segment can be sparsely reconstructed for a cost not exceeding a predetermined threshold, using existing entries in said dictionary, and, if not, adding said group of feature representations to said dictionary and adding said segment to said video highlights;

vii. repeating steps iii.-vi. until all segments in said video stream have been processed.

2. The system of claim 1 wherein each of said feature representations in said group of feature representations comprise a concatenation of at least two feature vectors.

3. The system of claim 2 wherein said at least two feature vectors includes a histogram of gradient and a histogram of optical flow.

4. The system of claim 1 wherein said number of detected interest points, and thus the number of feature vectors in said group of feature vectors, varies from segment to segment.

5. The system of claim 1 wherein a segment is added to said video highlights when the cost to perform said sparse reconstruction exceeds a predetermined threshold.

6. The system of claim 5 wherein the length of said video highlights can be varied by adjusting said predetermined cost threshold.

7. The system of claim 1 wherein a video segment is excluded from said video highlights when the cost to perform said sparse reconstruction is below a predetermined threshold.

8. The system of claim 1 wherein said video highlights contain said initial plurality of frames.

9. The system of claim 1 wherein said dictionary contains a matrix wherein the columns of said matrix are atoms containing groups of feature representations and wherein the rows of said matrix contain feature vectors.

10. The system of claim 9 wherein the number of atoms in said dictionary is fixed.

11. The system of claim 9 wherein said sparse reconstruction attempts to minimize the cost to reconstruct a group of feature representations for the current segment using said atoms contained in said dictionary.

12. The system of claim 11 wherein said cost to reconstruct is smaller when fewer atoms are needed to reconstruct said group of feature representations for said segment.

13. The system of claim 1 wherein said function of updating said dictionary minimizes the difference between a vector representing an event and a vector reconstructed using the dictionary, minimizes the number of dictionary items and requires that all feature vectors in nearby video segments use similar dictionary items.

* * * * *